United States Patent
Kawai

(10) Patent No.: US 6,756,767 B2
(45) Date of Patent: Jun. 29, 2004

(54) METHOD FOR CHARGING AND DISCHARGING BATTERY BASED ON CHARGING CAPACITY

(75) Inventor: Toshimichi Kawai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/274,866

(22) Filed: Oct. 22, 2002

(65) Prior Publication Data

US 2003/0076074 A1 Apr. 24, 2003

(30) Foreign Application Priority Data

Oct. 23, 2001 (JP) ........................................ 2001-324664

(51) Int. Cl.⁷ ........................ H01M 10/44; H01M 10/46
(52) U.S. Cl. ...................................... 320/125; 320/130
(58) Field of Search ................................ 320/124, 125, 320/130, 135, 150, 160

(56) References Cited

U.S. PATENT DOCUMENTS 4,829,225 A * 5/1989 Podrazhansky et al. ..... 320/129
5,606,242 A * 2/1997 Hull et al. .................. 320/106
6,211,653 B1 * 4/2001 Stasko ........................ 320/149

FOREIGN PATENT DOCUMENTS

| JP | 9-120843 | 5/1997 |
| JP | 2000-023388 | 1/2000 |
| JP | 2000-030750 | 1/2000 |

* cited by examiner

Primary Examiner—Edward H. Tso
(74) Attorney, Agent, or Firm—McGinn & Gibb, PLLC

(57) ABSTRACT

A nonaqueous-electrolyte secondary battery charging/discharging method that provides a prolonged cyclic life. In the charging/discharging method, a secondary battery is continuously charged unconditionally until a charging capacity exceeds 20% of a full charging capacity. The charging is completed when the charging capacity exceeds 70% of a full charging capacity. A maintenance charging/discharging operation is performed to avoid the full charging capacity being in an error state when dV/dt exceeds a specified value "a" before a charging current exceeds 70% of the full charging capacity. Likewise, the maintenance charging/discharging operation is performed to avoid the full charging capacity being in an error state when dT/dt exceeds a specified value "b" before a charging current exceeds 70% of the charging capacity.

21 Claims, 9 Drawing Sheets

OPERATION OF NUMERICAL CONVERTER

| INPUT | OUTPUT | |
|---|---|---|
| CHARGING CYCLE | UPPER LIMIT VOLTAGE VALUE IN SET CHARGING Vh (V) | LOWER LIMIT VOLTAGE VALUE IN SET CHARGING Vl (v) |
| 0 - 499 | 4.00 | 3.00 |
| 500 - 999 | 4.05 | 2.90 |
| 1000 - 1499 | 4.10 | 2.80 |
| 1500 - 1999 | 4.15 | 2.70 |
| 2000 - | 4.20 | 2.50 |

METHOD FOR CHARGING AND DISCHARGING BATTERY BASED ON CHARGING CAPACITY

BACKGROUND OF THE INVENTION

The present invention relates to a method for charging and discharging a nonaqueous electrolyte secondary battery. Particularly, the present invention relates to a method of charging and discharging a nonaqueous electrolyte secondary battery which provides excellent cyclic life characteristics.

Rechargeable secondary batteries, such as Nickel-cadmium (Ni—Cd) batteries, nickel-hydrogen (Ni—MH) batteries, and lithium-ion (Li-ion) batteries, are known batteries which are mounted on portable electronic equipment and which generate power driving the equipment. Such secondary batteries deteriorate through repeated charging and discharging and reduce the battery capacity thereof. These batteries have a cyclic life in which the battery capacity is substantially lost through repeated uses for a long period of time. For example, in Ni—MH batteries, repeated charging and discharging (or charging/discharging cycle) causes erosion or deterioration of the negative electrode or positive electrode, thus producing non-uniformity of the electrolysis solution. This results in a cyclic life in which only the charging capacity of substantially a half of the initial full charging capacity of a battery cell can be obtained.

Such a cyclic life can be predicted when examination is made, for example, by limiting the temperature and current in charging/discharging to predetermined conditions. However, because actual batteries are used in various situations, the charging/discharging cycles described on product catalogs cannot be applied to all batteries. Particularly, over-charging or over-discharging often causes a shortage in the cyclic life of the battery. For that reason, in the design and development of the secondary batteries, the problem is to fabricate batteries that adapt to working conditions and environments and that have sufficient cyclic operational life.

By the way, the secondary batteries having the above-mentioned cyclic life are used for electronic equipment, including information equipment (such as digital cameras, personal computers, and the like) and communications equipment (such as personal telephones). However, the time period for which the equipment can be used through one-time charging is shortened with degradation of the battery capacity.

When the battery reaches the end of its cyclic life, the electronic equipment itself does not work substantially. In such a case, the user cannot simply determine whether the equipment is in failure or the battery is dead or the battery has reached the end of its cyclic life. In such a situation, it is necessary to detect the cyclic life of the secondary battery on the side of the electronic measuring equipment and tell the user the detected information.

There a method of predicting a battery capacity by measuring the internal resistance inherent in a battery and by detecting the rate of increase with the charging/discharging cycles or by integrating the capacity until the battery becomes an empty state through discharging from a full charging state.

However, the internal resistance measuring method requires a high-precision measuring device. Moreover, in the method of integrating changes in battery capacity due to discharging, because the voltage across a detection resistor through which the current flows is amplified and detected, power is wasted. Moreover, this method requires a high-precision amplifier.

It may be considered that the count value of charging/discharging cycles is stored in a memory disposed in the battery. However, such a memory leads to increasing the fabrication costs. Moreover, the problem is that some use conditions of a battery result in the charging/discharging count of an initial promised cyclic life not matching with the actual charging/discharging count.

In recent years, nonaqueous electrolyte secondary batteries have been made of an alkali metal such as lithium acting as the negative electrode active substance, and an electrolysis solution in which $LiClO_4$, $LiBF_4$, $iAsF_6$, $LiPF_6$, or $LiCF_3SO_3$ is dissolved in an organic solvent. The organic solvent is, for example, propylene carbonate, γ-butyrolactone, dimethoxyethane, tetrahydrafuran, or dioxane. These nonaqueous electrolyte batteries, having a high energy density, have been broadly used for small-size electronic devices such as electronic watches, cameras, and others. One of problems in making it possible to charge a nonaqueous electrolyte battery of that type is suppressing an arboreous, fibrillar, or acerate alkaline metal separated out on the negative electrode in the course of charging process; that is, the so-called dendrite. When the dendrite grows excessively, the operational life of the battery may be instantaneously terminated because of an internal shorted-circuit between the negative electrode and the positive electrode. Even if it is tried to dissolve the dendrite in the course of the post-discharging, the dendrite is locally dissolved and part thereof is electrically alienated from the polar plate. For that reason, all dendrites cannot be dissolved. That is, this phenomenon decreases a discharging (dissolution) amount to a charging (precipitation) amount, thus deteriorating the charging/discharging efficiency.

Two methods have been conventionally proposed to suppress the formation of dendrite in the course of the charging/discharging. In one method charging is carried out under such moderate conditions that the negative electrode potential is maintained at more than $-50$ mVvs.Li+/Li and that the alkali metal (lithium) to be educed is maintained at 0.3 $mAh/cm^2$. In the other method, the charging/discharging efficiency is simultaneously improved by combining the electrolysis solution and a solvent of a high dielectric constant and of a low viscosity. These approaches are based on the idea of uniformly a separation reaction of the alkali metal on the electrode surface and thus suppressing the separation of dendrite.

However, even if the above-mentioned methods are employed, it is still difficult to fabricate a nonaqueous electrolyte secondary battery which has a cyclic life of 500 cycles or more, practically required as a secondary battery, while a high energy density is maintained. This difficulty comes from the fact that minute heterogeneous reactions repeated with charging/discharging cycles and integration of dendrite lead to changes to the heterogeneous reaction on electrodes. The minute uniformity results from the formation of a passive film through the reaction between an alkali metal acting as an active substance and an electrolysis solution or from differences in internal pressure applied to the respective electrodes in the winding-type battery. Moreover, the unevenness is triggered by the formation of dendrite and a decrease in charging/discharging efficiency.

In secondary batteries, a high voltage caused in charging may induce a dangerous state such as smoking or burning.

In such a case, an irreversible chemical reaction may occur inside the battery, thus remarkably reducing the battery performance. Moreover, a low voltage caused in discharging may also induce an irreversible chemical reaction inside a battery, thus remarkably reducing the battery performance. For secondary batteries, manufacturers specify the upper limit voltage and the lower limit voltage, to be obeyed by users, to maintain batteries in safe state and to suppress drastic decreases in the performance thereof.

Generally, a secondary battery has a tendency of both the chargeable capacity and the dischargeable capacity decreasing as charging and discharging are repeated. The capacity decrease is called cyclic deterioration, or merely, deterioration. This is a matter of the operational life of a battery. There are several kinds of definitions of the chargeable/dischargeable capacity of a secondary battery. Typically, the chargeable/dischargeable capacity is defined as the product of an output power or output current when a battery charged to the upper voltage has been discharged to the lower voltage, multiplied by a discharging time period.

One reason for deterioration of a battery is that the battery is charged to the upper limit voltage and then discharged to the lower limit voltage, or that the chargeable/dischargeable capacity are used in its full range. This results from the fact that heat generation or electrolysis at the termination of charging or discharging causes deformation of the structure of a battery or changes in a substance's properties, thus resulting in deterioration of the battery.

The capacity of a brand-new battery, that is, the capacity in small charging/discharging cycles after product shipment, or in the time when a battery has operated only for a short period of time, is defined as 100%. According to types or uses of batteries, the time period when the capacity becomes 70% or 80% is defined as the life of a battery. The charging/discharging repeated to the operational life is called a cyclic life.

When a battery is charged to the upper limit or discharged to the lower limit, the initial capacity is large but the battery quickly deteriorates, as shown in the curve "a" in FIG. 4. On the other hand, when the battery is charged below the upper limit and discharged above the lower limit, the initial capacity becomes small but the battery gradually deteriorates, as shown in the curve "b" in FIG. 4. However, the cyclic life is not much extended.

In order to deal with such problems, the technique disclosed in JP-P1997-120843A was proposed. According to this technique, when a secondary battery is new, the charging voltage is set to a value lower than the set upper limit or the discharging voltage is set to a value higher than the set lower limit, or both are carried out. As the chargeable/dischargeable capacity decreases, the charging voltage is set to a value close to the upper limit or the discharging voltage is set to a value close to the lower limit or both are carried out. Thus, suppressing a decrease in chargeable/dischargeable capacity of a secondary battery prolongs the operational life.

The conventional technique will be explained below as a first prior art by referring to the attached drawings.

FIG. 5 is a block diagram of the first prior art and FIG. 6 is a flowchart of the first prior art.

As shown in FIG. 5, the secondary battery 55 is connected to the controller 54 in the charging/discharging controller 51. The secondary battery 55 is a lithium-ion secondary battery. In the lithium-ion secondary battery, the positive active substance is $LiCoO_2$; the negative active substance is a carbon; and the nonaqueous electrolyte (electrolysis solution) is an electrolysis solution.

A power source 57, which supplies a dc voltage and a dc current, is connected to the controller 54. A load 56, which consumes power, corresponds to, for example, an electric valve, an iron, a motor, a computer, or a radio set. The load 56 is connected to the controller 54.

The charging/discharging controller 51 consists of a capacity decider 52, a charging/discharging voltage setter 53, and a controller 54. The capacity decider 52 is formed of a count setter 520 and a counter 521. The count setter 520 is formed of, for example, a digital switch. When the secondary battery 55 is replaced by another battery, the count setter 520 sets the charging/discharging cycles counted till that time. The charging/discharging count set by the count setter 520 is set in the counter 521. The counter 521 is, for example, a digital counter.

The counter 521 transmits the charging/discharging count based on digital signals, to the numerical converter 59 in the charging/discharging voltage setter 53.

The numerical converter 59 sets the upper limit charging voltage value Vh and the lower limit discharging voltage value Vl set to the charging count (cycle), as shown in FIG. 7. For example, when the charging cycle is 0 to 499, the upper limit charging voltage value Vh is set to 4.0 volts and the lower limit discharging voltage value is set to 3.0 volts. When the charging cycle is 500 to 999, the upper limit charging voltage value Vh is set to 4.05 volts and the lower limit discharging voltage value Vl is set to 2.9 volts. When the charging cycle is 1000 to 1499, the upper limit charging voltage value Vh is set to 4.1 volts and the lower limit discharging voltage value Vl is set to 2.8 volts. When the charging cycle is 1500 to 1999, the upper limit charging voltage value Vh is set to 4.15 volts and the lower limit discharging voltage value Vl is set to 2.7 volts. When the charging cycle is 2000 or more, the upper limit charging voltage value Vh is set to 4.2 volts and the lower limit discharging voltage value Vl is set to 2.5 volts.

In the charging/discharging voltage setter 53, the D/A converter 510 converts the upper limit charging voltage value set in the numerical converter 59 into an actual set voltage. The D/A converter 511 converts the lower limit discharging voltage value set in the numerical converter 59 into an actual set voltage.

The D/A converter 510 transmits the upper-limit charging voltage value Vh to the comparator 512 in the controller 54. The D/A converter 511 transmits the lower-limit discharging voltage value Vl to the comparator 513 in the controller 54. The controller 54 is formed of the comparators 512 and 513, the charging/discharging commander 514, and the switches 515 and 516.

The comparator 512 compares the upper-limit charging voltage value Vh from the D/A converter 510 with the voltage value Vb of the secondary battery 55 and then transmits the result to the charging/discharging commander 514. The comparator 513 compares the lower-limit discharging voltage value Vl from the D/A comparator 511 with the voltage value Vb of the secondary battery 55 and then transmits the result to the charging/discharging commander 514. Each of the comparators 512 and 513 is formed of, for example, a voltage comparator.

The charging/discharging commander 514 is formed of, for example, logic circuits. While watching signals from the comparators 512 and 513, the charging/discharging commander 514 ceases the charging operation when $Vb \geq Vh$, thus allowing the discharging operation. When $Vh > Vb > Vl$, the charging/discharging commander 514 continues the previous state. When $Vb \leq Vl$, the charging/discharging commander 514 ceases the discharging operation, thus allowing the charging operation.

The charging/discharging commander 514 transmits a charging signal to the counter 521. The counter 521 adds occurrences of the charging signals.

When a charge allowance is issued, the switch 515 connects the power source 57 to the secondary battery 55 according to the charging signal from the charging/discharging commander 514. When a charge allowance is not issued, the switch 515 does not connect the power source 57 to the secondary battery 55. When a discharge allowance is issued, the switch 516 connects the load 56 to the secondary battery 55 according to the charging signal from the charging/discharging commander 514. When a discharge allowance is not issued, the switch 516 does not connect the load 56 to the secondary battery 55. Each of the switches 515 and 516 is formed of, for example, an electromagnetic relay or a semiconductor switch.

In the above-mentioned configuration, cyclic operation is repeated by charging the secondary battery 55 up to the upper-limit charging voltage value Vh by means of the power source 57 and discharging the secondary battery 55 up to the lower-limit discharging voltage value Vl by means of the load 56.

The operation of the above-mentioned example will be explained here by referring to FIG. 6.

First, when the secondary battery 55 is connected to the charging/discharging controller 51, the charging/discharging count, that is, the chargeable/dischargeable capacity decision value of the secondary battery 55, is set in the count setter 520 in the capacity decider 52 (step S1).

Next, in the step S2, the capacity decider 52 decides the chargeable/dischargeable capacity by means of the signals from the controller 54 (step S2).

Next, the charging/discharging voltage setter 53 changes the upper-limit charging voltage Vh and the lower-limit discharging voltage Vl, in accordance with the chargeable/dischargeable capacity decision value, that is, in accordance with the charging/discharging count (cycles) (step S3).

Next, the comparator 512 compares the upper-limit charging voltage Vh with the battery voltage Vb. The comparator 513 compares the lower-limit discharging voltage Vl with the battery voltage Vb. In the comparison, when Vb≧Vh, the charging/discharging commander 514. prohibits charging but allows discharging, in the step S5B. When Vh>Vb>Vl and charging is in an allowance state, the charging/discharging commander 514 allows charging but prohibits discharging in the step S5A. When Vh>Vb>Vl and discharging is in an allowance state, the charging/discharging commander 514 prohibits charging but allows discharging in the step S5B (steps S4A and S4B).

When Vb≦Vl, the charging/discharging commander 514 allows charging but prohibits discharging in the step S5A. The charging/discharging commander 514 measures the chargeable/dischargeable capacity in the step S2.

The charging/discharging commander 514 allows charging but prohibits discharging in the step S5A. Thus, the switch 516 opens to disconnect the secondary battery 55 from the load 56 while the switch 515 closes to connect the power source 57 with the secondary battery 55 (step S6A).

In the step S5B, the charging/discharging commander 514 prohibits charging but allows discharging. Thus, the switch 515 opens to disconnect the power source 57 from the secondary battery 55 while the switch 516 closes to connect the secondary battery 55 with the load 56 (step S6B).

Next, the flow goes back to the steps S4A and S4B and the operation is repeated.

It is now assumed that the dischargeable capacity of a new secondary battery immediately after manufacture, with the upper-limit voltage of 4.2 volts and with the lower-limit voltage of 2.5 volts, is defined as 100%. It is assumed that the discharging capacity, with the initial upper-limit charging voltage set to 4.0 volts and the lower-limit discharging voltage set to 3.0 volts, is defined as 80% of the dischargeable capacity. In such a case, when the discharging capacity drops to 70% through repeated charging/discharging, the upper-limit charging voltage is set to 4.05 volts and the lower-limit discharging voltage is set to 2.9 volts. This control allows the discharging capacity to be restored up to 80%. Moreover, every time when the discharging capacity decreases to 70% through the repeated charging/discharging operation, the upper-limit charging voltage is charged from 4.10 volts to 4.15 volts while the lower-limit discharging voltage is charged from 2.8 volts to 2.7 volts. Finally, the secondary battery is used until the discharging capacity decreases to 70%, with the upper-limit charging voltage of 4.20 volts and with the lower-limit discharging capacity of 2.5 volts. In the charging/discharging method, a change in charging/discharging capacity is shown with the curve "c" shown in FIG. 4. The corresponding charging/discharging capacity is shown with the curve "d" shown in FIG. 4.

The above-described operation suppresses a decrease of the chargeable/dischargeable capacity of the secondary battery 55.

However, because the initial charging capacity of a battery is set as a full charging capacity, the prior art system tries to charge up to 80% of the initial charging capacity, regardless of deterioration of the battery caused by repeated charging/discharging. For that reason, there is the problem in that charging the deteriorated battery over its charging capacity accelerates further deterioration of the deteriorated battery under some conditions.

JP-P2000-23388A discloses the same kind of technology. In this technology, the charging constant voltage is set to a low value. As the charging cycle advances, the charging voltage gradually increases. Thus, deterioration of the electrodes can be suppressed while an adverse effect caused by deterioration due to temperature can be compensated. As a result, the charging/discharging cyclic life of the secondary battery can be prolonged.

JP-P2000-30750A discloses two methods for charging a nonaqueous secondary battery having excellent cyclic life characteristics. In one charging method, a nonaqueous secondary battery includes a chargeable/dischargeable positive electrode, an electrolysis solution, and a chargeable/dischargeable negative electrode. After the secondary battery begins its charging, the charging is ceased before the closed circuit voltage of the secondary battery reaches the decomposition voltage of the electrolysis solution. In the other charging method, after the secondary battery begins its charging, the charging is ceased before the capacity charged therein reaches the rated capacity thereof.

JP-P1998-255854A discloses a method of charging and discharging a nonaqueous electrolyte secondary battery which maintains the uniform electrode reaction and prolongs the charging/discharging cycle life. This method discloses the technique of repeating the charging/discharging cycle to increase the discharging electric amount more than the charging electric amount and then fully charging the battery when the discharging capacity becomes a constant value or less.

Next, a second prior art will be explained below.

FIG. 8 is a block diagram illustrating the second conventional technique. FIG. 9 is a graph plotting capacity maintenance ratios and constant-current charging capacity ratios of a lithium-ion secondary battery versus changes of charging/discharging cycles. FIG. 10 is a characteristic diagram illustrating charging voltage curves of a lithium-ion secondary battery. FIG. 11 is a characteristic diagram illustrating a charging voltage curve of a nickel-cadmium secondary battery and a charging voltage curve of a nickel-hydrogen secondary battery.

In the secondary battery capacity deterioration decider, as shown in FIG. 8, the charger is connected to the secondary battery 312 such as a lithium-ion battery, a nickel-cadmium battery or a nickel-hydrogen battery. The identification element 320 detects the type of the secondary battery 312.

The controller 318 starts a constant current charging process in accordance with the battery voltage of the secondary battery 312. When the battery voltage reaches a reference voltage value according to the type of the secondary battery 312 during the charging process, the timer disposed in the controller 318 starts measuring the constant current charging time period. When the changeover to the constant voltage charging, or $-\Delta V$, is detected through the charging control system in accordance with the battery type, the time measuring operation ends. $-\Delta V$ means a small drop of a battery voltage which occurs while a battery is being charged in spite of being in a full charged state.

The controller 318 compares the measured constant current charging time with the constant current charging time at the initial stage of the battery. Based on the comparison result, the controller 318 decides the degree of cyclic degradation of the battery charge capacity of the battery in accordance with the battery type. The notifier 326 notifies the user of the decision result.

Next, the charging/discharging cycle of a chargeable/dischargeable lithium-ion secondary battery will be explained by referring to FIG. 10.

In FIG. 10, the curve 40a represents a charge voltage curve corresponding to one charge/discharge cycle. The curve 40b represents a charge voltage curve corresponding to 100 charge/discharge cycles. The curve 40c represents a charge voltage curve corresponding to 200 charge/discharge cycles.

As shown in FIG. 10, the constant current charge (CC) time period which is taken from the voltage at a charge starting time or from a predetermined voltage VP1 during constant current charging to the constant voltage charging (CV) is shortened with an increasing number of battery charging/discharging cycles. The constant current charge (CC) time 42 in the curve 40c is shorter than the constant current charge (CC) time 44 in the curve 40a. When the constant current charging is completed, the lithium-ion secondary battery is shifted to the region of the constant voltage charging (CV) and thus charged. It is decided whether or not the battery is in a fully charged state during the constant voltage charging. Thus, when the lithium-ion secondary battery is in a fully charged state, the charging operation is completed.

As the charging/discharging cycle becomes large through repeated charging/discharging, the constant current charging time is shortened so that the battery capacity is reduced.

FIG. 11 shows charging voltage curves in the case where a nickel-cadmium (Ni—Cd) secondary battery or a nickel-hydrogen (Ni—MH) secondary battery is subjected to constant current charging and the charging operation is stopped by means of the $-\Delta V$ detection method. According to the $-\Delta V$ detection method, as a secondary battery such as a nickel-cadmium battery is charged with a constant current, the terminal voltage thereof increases. When the maximum value of the terminal voltage is detected, the terminal voltage decreases by a small value from the maximum value thereof. Thus, the charging control such as full charging process is carried out.

As shown in FIG. 11, after repeated cycles of charging/discharging, the CC time 52 of the curve 50b, corresponding to 200 charging cycles, is shorter than the CC time 54 of the curve 50a corresponding to one charging cycle. Here, the CC time corresponds to the time period between a charge starting time, or the time when the predetermined voltage VP2 appears during the constant current charging (CC), and the time when a small drop ($-\Delta V$) of the terminal voltage is detected.

In FIG. 9, the curve 30 shows how the capacity maintenance ratio of a lithium-ion secondary battery decreases through repeated charging/discharging cycles. The cyclic life means the cycle number or the state of a battery at the time when the capacity maintenance ratio is 50% to 60%. The capacity maintenance ratio shows a ratio of a current full charging capacity of a battery to an initial full battery charging capacity thereof. The capacity maintenance ratio of a battery at the start of use is defined as 100%. When the charging/discharging cycle is repeated, the battery becomes a full charging state where the charging is saturated, so that the capacity maintenance ratio decreases. When the charging/discharging is further repeated, the capacity maintenance ratio becomes 50% to 60%. Thus, it is determined that the battery has reached its cyclic life.

Referring to FIG. 9, the curve 32A shows the charging/discharging cycle of a secondary battery A. The curve 32B shows the charging/discharging cycle of a secondary battery B. The curve 32C shows the charging/discharging cycle of a secondary battery C. The secondary batteries A, B and C are lithium ion batteries, but are produced by different manufacturers and have different performances. The constant current charging capacity ratio is a ratio of a battery capacity of a brand-new battery to be initially charged through constant current charging to a battery capacity of a battery in current use to be charged through constant current charging. This constant current charging capacity ratio corresponds to a constant current charging time period charged with constant current.

By referring to FIG. 9, there is seen a correlation between the capacity maintenance rate and the constant current charging (CC) capacity rate (ratio), although there is somewhat a difference between the battery types A, B and C. The constant current charging time is shortened as the constant current charging (CC) capacity decreases with cyclic deterioration. The capacity maintenance rate of a secondary battery can be determined. Thus, it can be checked whether or not the battery has reached its cyclic life.

However, the second prior art has a problem in that when charging/discharging is repeated, the integrated capacity errors are accumulated, so that whether or not the battery operational life has reached cannot be accurately determined.

SUMMARY OF THE INVENTION

The present invention is made to solve the above-mentioned problems. An object of the present invention is to provide an improved method for charging and discharging a nonaqueous electrolyte secondary battery, whereby a prolonged cyclic life is obtained.

In an aspect of the present invention, an apparatus for charging and discharging a nonaqueous electrolyte secondary battery comprises a first switch for connecting or disconnecting a secondary battery and a charging power source; a second switch for connecting or disconnecting the secondary battery and a load; a full charging capacity memory for storing a full charging capacity value of the secondary battery; means for detecting a charging capacity of the secondary battery during charging, for connecting the secondary battery and the charging power source by controlling the first switch when the detected charging capacity is less than a first predetermined ratio of the full charging capacity, and for disconnecting the secondary battery and the charging power source by controlling the second switch when the detected charging capacity is a second predetermined ratio or more of the fill charging capacity; means for calculating a voltage variation dV/dt of the secondary battery during charging; means for calculating a temperature variation dT/dt of the secondary battery during charging; means for deciding whether or not each of the voltage variation dV/dt and the temperature variation dT/dt exceeds a specified value, detecting whether or not the secondary battery is in a full charging state during charging based on the voltage and the temperature of the secondary battery during charging when at least one of the voltage variation dV/dt and the temperature variation dT/dt exceeds a specified value, and controlling the second switch when the secondary battery is in a fill charging state, thus connecting the secondary battery and the load to discharge the secondary battery; and means for detecting completion of discharging of the secondary battery, computing a full charging capacity based on a discharging current when discharging is completed, and updating a full charging capacity stored in the full charging capacity memory.

In the apparatus, the secondary battery comprises a nickel-hydrogen battery.

Another aspect of the present invention, a method for charging and discharging a nonaqueous electrolyte secondary battery comprises calculating a voltage variation dV/dt of the secondary battery during charging; calculating a temperature variation dT/dt of the secondary battery during charging; detecting a charging capacity of the secondary battery during charging and then, when the charging capacity detected is less than a predetermined ratio of a stored full charging capacity, deciding whether or not at least one of a detected voltage variation dV/dt and a detected temperature variation dT/dt exceeds a previously specified value; when at least one of the detected voltage variation dV/dt and the detected temperature variation dT/dt exceeds the previously specified value, detecting whether or not the secondary battery during charging is in a full charging state based on the voltage and the temperature of the secondary battery during charging; discharging the secondary battery when a full charging state is detected; detecting completion of discharging of the secondary battery, computing, upon completion of charging, a full charging capacity based on a discharging current of the secondary battery, and updating the stored full charging capacity; and completing charging of the secondary battery when the stored charging capacity is a predetermined ratio or more of a stored full charging capacity.

The method further comprises the step of charging the secondary battery unconditionally in initial charging thereof until a current charging capacity reaches 20% of the full charging capacity.

In another aspect of the present invention, a method for charging and discharging a nonaqueous electrolyte secondary battery comprises recharging a battery to less than a full charging amount of the battery; and supplying a recharging amount to a load.

In the method, the recharging amount is set to 70% of the full charging amount.

The method further comprises the step of continuously charging the battery unconditionally in initial charging thereof until a current charging capacity reaches 20% of a reference charging amount.

In the method of the present invention, said battery comprises a nickel-hydrogen battery.

In another aspect of the present invention, a method for charging and discharging a nonaqueous electrolyte secondary battery comprises continuously charging the secondary battery unconditionally until the charging capacity exceeds 20% of a full charging capacity because the temperature and the voltage of the battery become unstable in initial charging; ending the charging operation when the charging capacity exceeds 70% of the full charging capacity; performing a maintenance charging/discharging operation because there is the possibility of an erroneous full charging capacity when dV/dt exceeds a specific value "a" before the charging capacity exceeds 70% of the full charging capacity; and performing the maintenance charging/discharging operation because there is the possibility of an erroneous full charging capacity when dT/dt exceeds a specific value "b" before the charging capacity exceeds 70% of the full charging capacity.

The method further comprises by means of a controller, acquiring a voltage of the battery from a voltage measuring section and a temperature of the battery from a temperature measuring section and thus detecting full charging (S22); when a full charging is detected, turning on a switch and supplying power from the battery to a load (S24); simultaneously acquiring a discharging current from a charge/discharge current measuring section and integrating a discharging capacity (S25); and simultaneously acquiring a battery voltage of the battery from a voltage measuring section, ending discharging (S27) and capacity integration (S28) by turning off the switch when the battery voltage becomes empty, and updating the full charging capacity (S29).

BRIEF DESCRIPTION OF THE DRAWINGS

These and other objects, features and advantages of the present invention will become more apparent from the following detailed description taken in conjunction with the attached drawings, in which.

DESCRIPTION OF THE EMBODIMENTS

The secondary battery charging/discharging method according to the present invention will be described below in detail by referring to the attached drawings.

Figure 1:
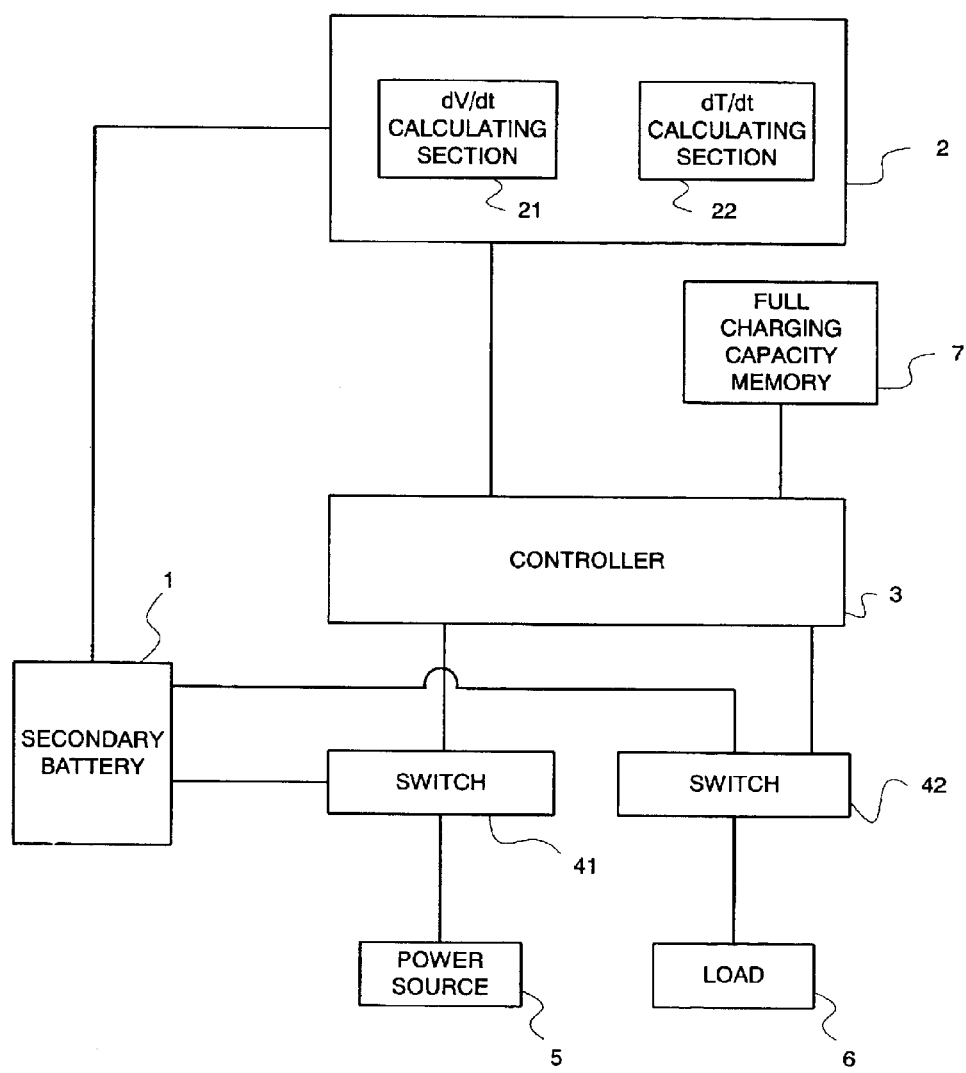
FIG. 1 is a block diagram illustrating a secondary battery charging/discharging apparatus according to the present invention.

FIG. 1 is a block diagram illustrating a secondary battery charging/discharging apparatus according to an embodiment of the present invention.

Referring to FIG. 1, a secondary battery 1 is connected to a measuring section 2 and to switches 41 and 42. A power source 5, which supplies a dc voltage and a dc current, is connected to the switch 41. A load 6, which consumes power, is connected to the switch 42.

When a charging allowance is issued, the switch 41 connects the power source 5 to the secondary battery 1 based on a signal from a controller 3. When a charging allowance is not issued, the switch 41 disconnects the power source 5 from the secondary battery 1.

When a discharging allowance is issued, the switch 42 connects the load 6 with the secondary battery 1 based on the signal from the controller 3. When a discharging allowance is not issued, the switch 42 disconnects the load 6 from the secondary battery 1.

The battery voltage variation dV/dt calculating section 21 calculates a battery voltage variation dV/dt of the secondary battery 1.

The battery temperature variation dT/dt calculating section 22 calculates a battery temperature variation dT/dt of the secondary battery 1.

Figure 2:
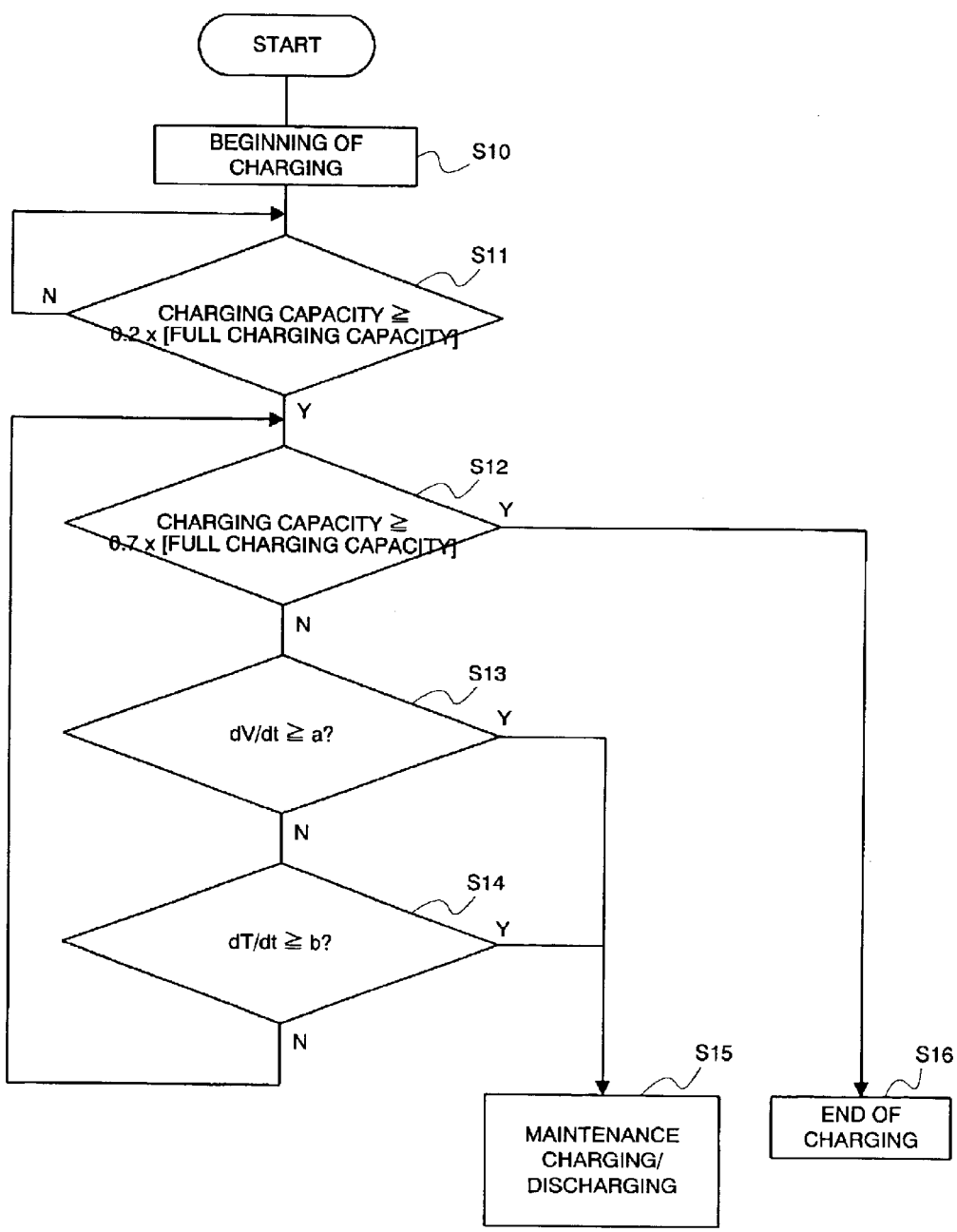
FIG. 2 is a flowchart showing a secondary battery charging and discharging method according to an embodiment of the present invention.

FIG. 2 is a flowchart showing a secondary battery charging and discharging method according to an embodiment of the present invention.

The secondary battery 1 is first charged in the step S10.

Next, in the step S11, because the battery temperature and the battery voltage become unstable at the initial stage of charging, the secondary battery 1 is continuously charged unconditionally until the charging capacity exceeds 20% of the full charging capacity.

In the step S12, the controller 3 determines whether or not the charging capacity exceeds 70% of the full charging capacity.

In the step S16, when the charging capacity exceeds 70% of the full charging capacity, the charging is ended.

In the step S13, when the charging capacity does not exceed 70% of the full charging capacity, the battery voltage variation dV/dt calculating section 21 calculates a battery voltage variation dV/dt per unit time. The controller 3 determines whether or not the battery voltage variation dV/dt has exceeded a specified value "a".

In the step S15, maintenance charging/discharging is carried out because the full charging capacity value may be varied when the battery voltage variation dV/dt exceeds the specified value "a".

In the step S14, when the battery voltage variation dV/dt does not exceed the specified value "a", the battery temperature variation dT/dt calculating section 22 calculates a battery temperature variation dT/dt per unit time. The controller 3 determines whether or not the battery temperature variation dT/dt has exceed a specified value "b".

In the step S15, because the full charging capacity value may be varied when the battery temperature variation dT/dt exceeds the specified value "b", maintenance charging/discharging is carried out.

When the battery temperature variation dT/dt does not exceed the specified value "b", the flow goes back to the step S12.

Next, the maintenance charging/discharging will be explained by referring to FIG. 3.

Figure 3:
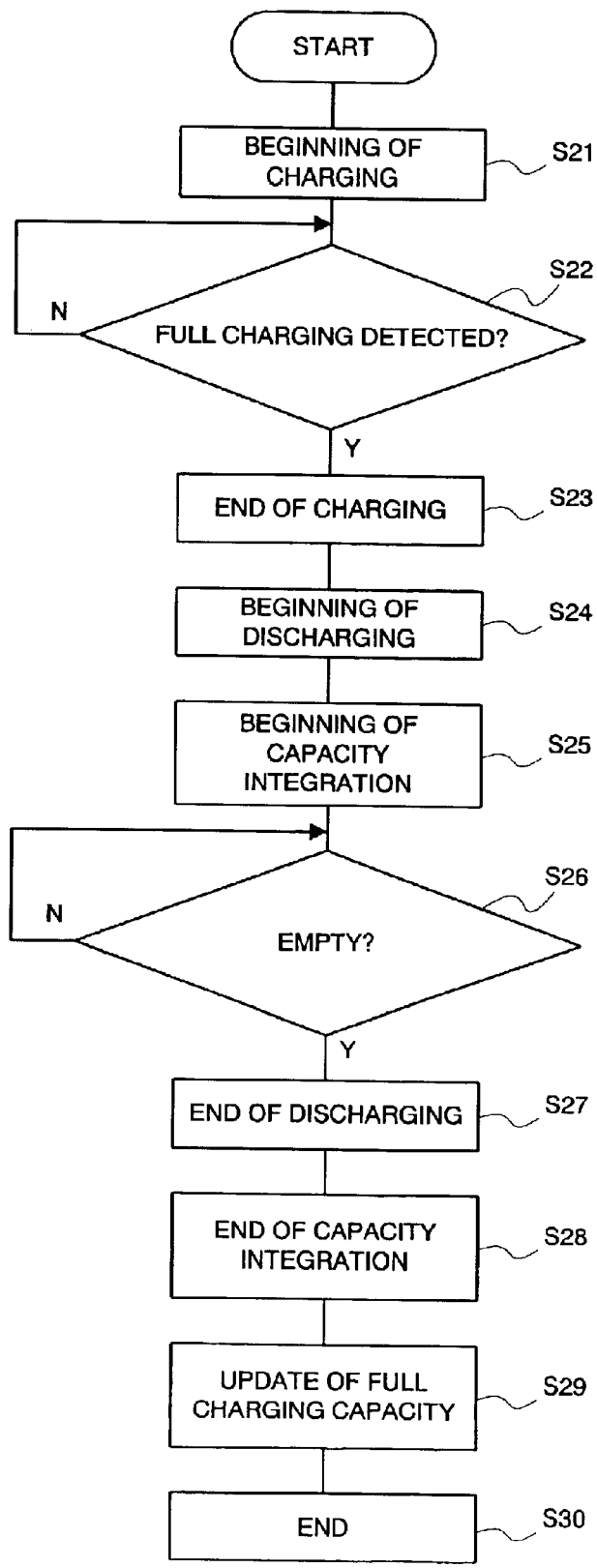
FIG. 3 is a flowchart showing in detail a maintenance charging/discharging operation.
Figure 4:
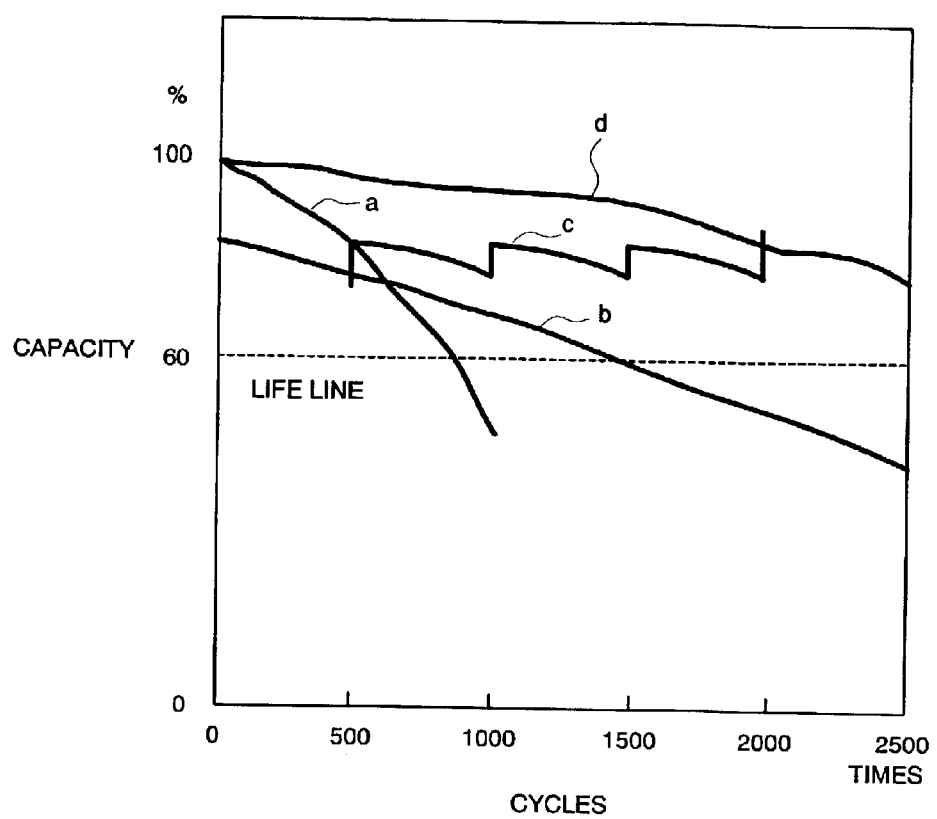
FIG. 4 is a graph plotting relationships between cycles and capacity.
Figure 5:
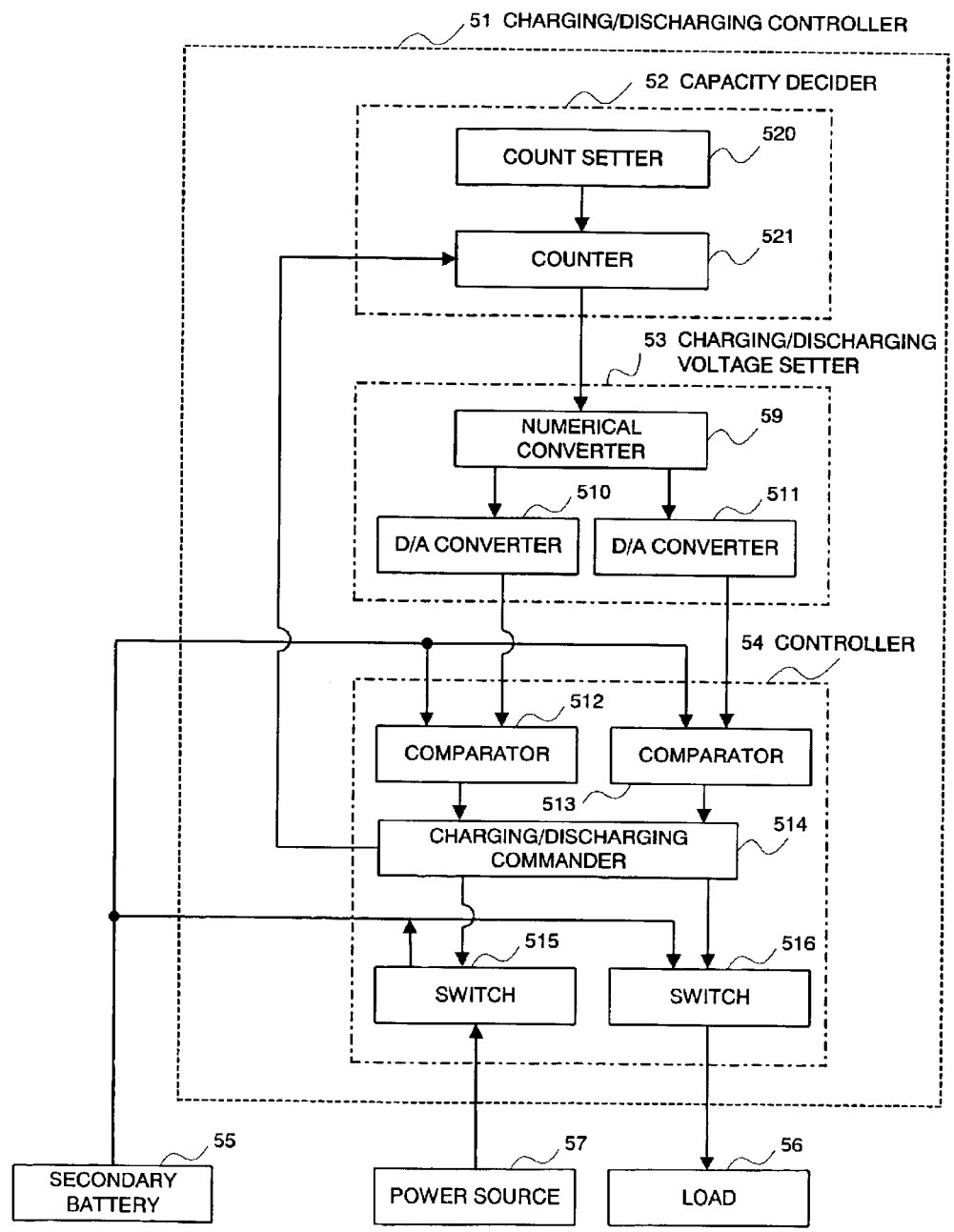
FIG. 5 is a block diagram illustrating a charging/discharging system of a first related art.
Figure 6:
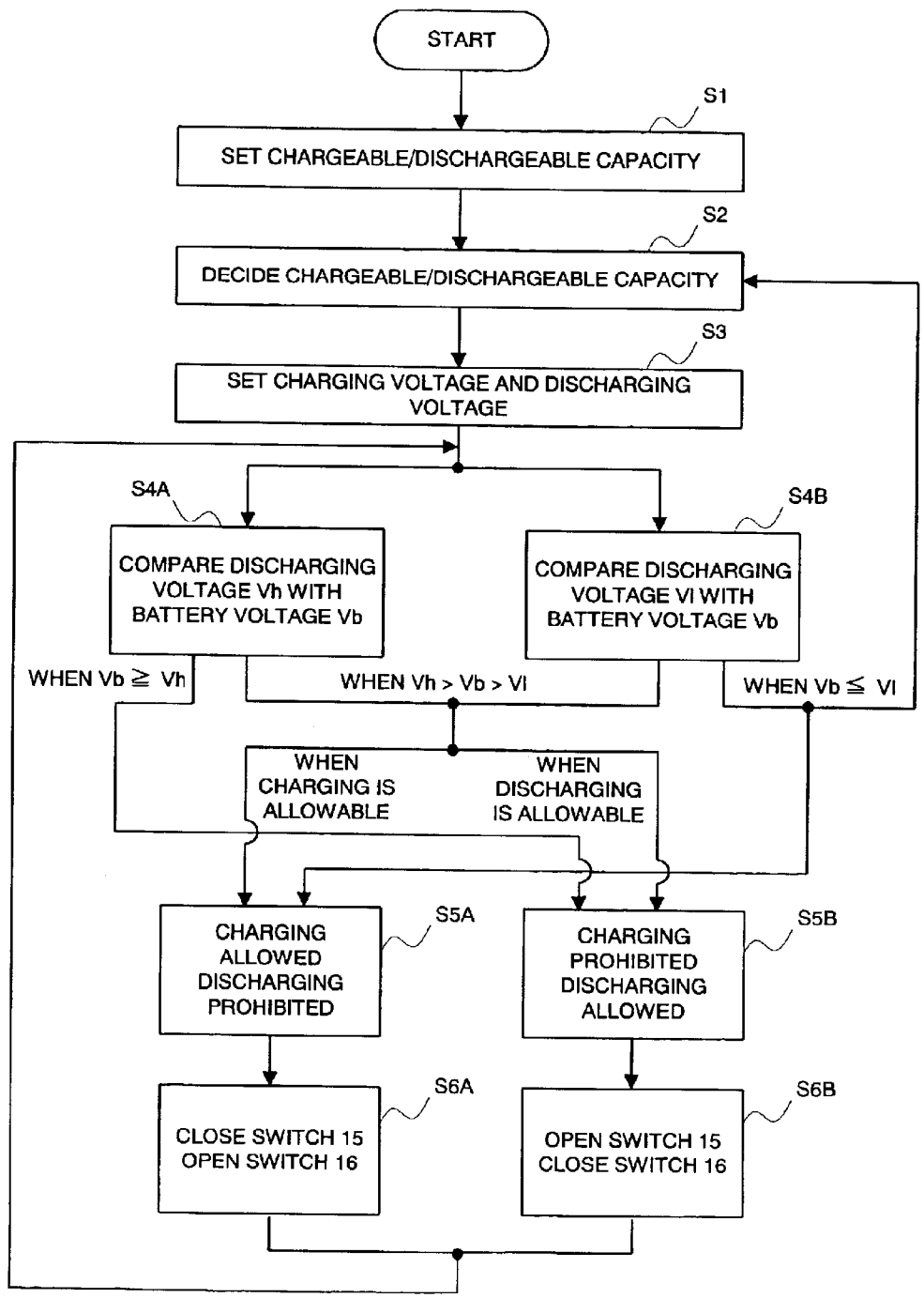
FIG. 6 is a flowchart showing the charging/discharging process in the first related art.
Figures 7, 8:
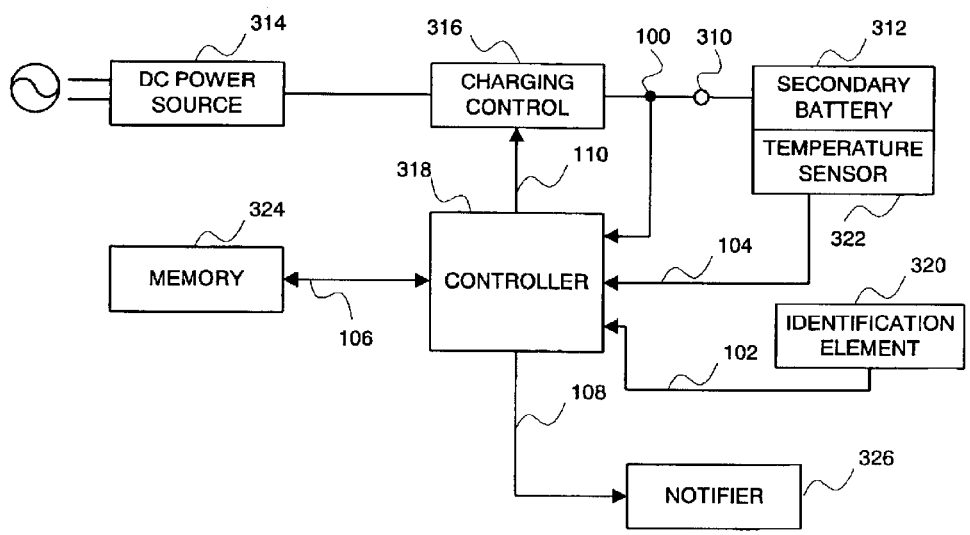
FIG. 7 is a table showing an operation of a numerical converter.
FIG. 8 is a block diagram illustrating a charging/discharging system in a second related art.
Figure 9:
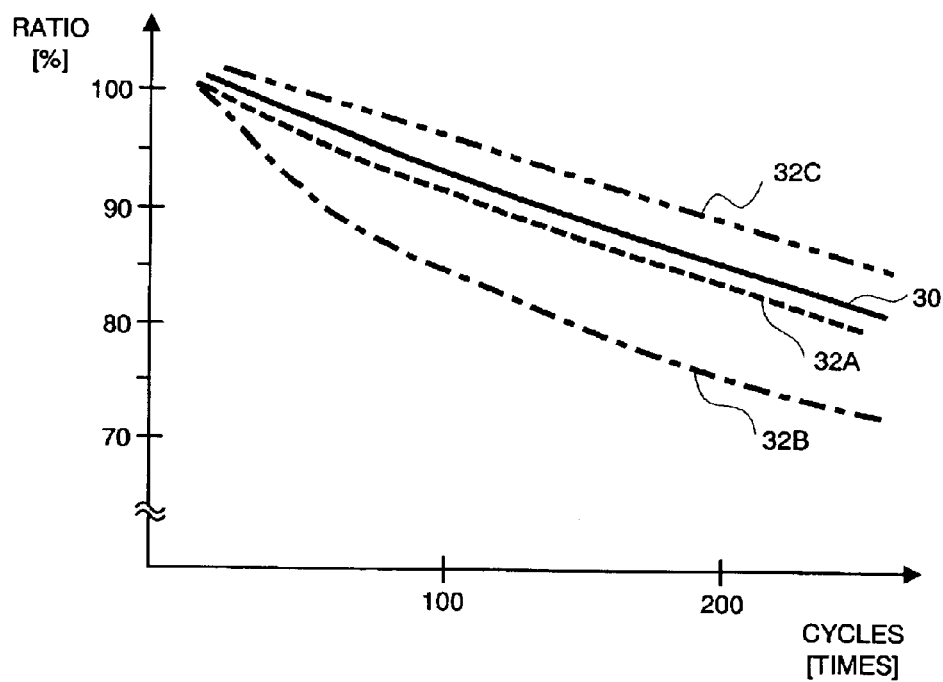
FIG. 9 is a graph plotting the characteristic of the system shown in FIG. 8.
Figure 10:
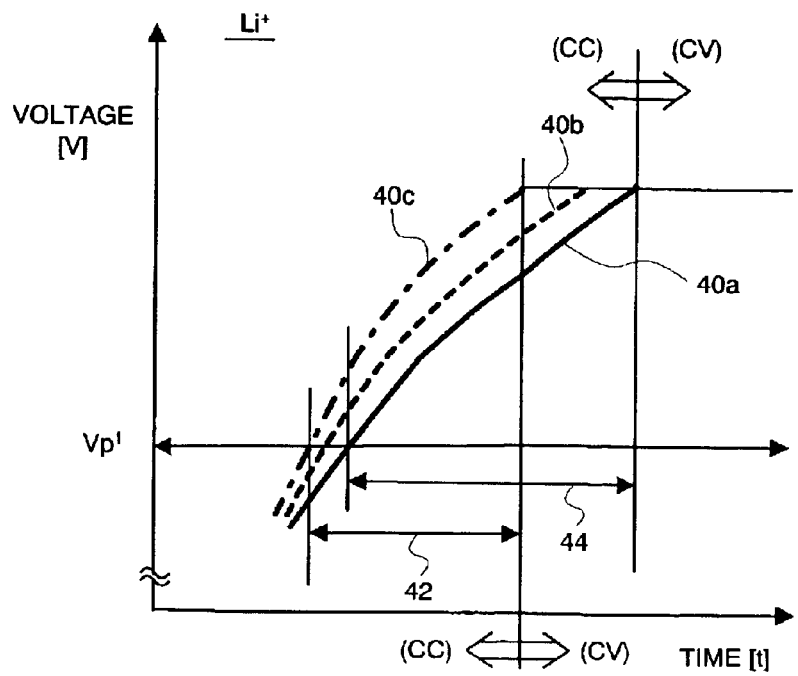
FIG. 10 is a graph plotting the characteristic of the system shown in FIG. 8.
Figure 11:
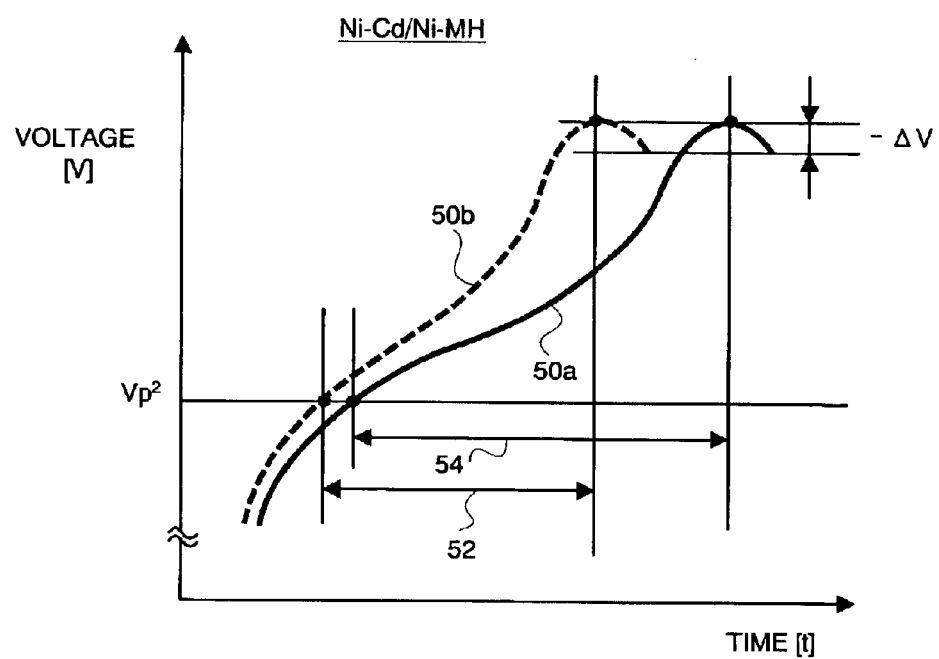
FIG. 11 is a graph plotting the characteristic of the system shown in FIG. 8.

FIG. 3 is a flowchart showing in detail maintenance charging/discharging.

When the mode changes to the maintenance charging/discharging in step S21, the controller 3 in step S22 detects the full charging of the secondary battery 1 based on the battery voltage thereof and the battery temperature thereof.

In the step S23, when full charging is detected, the controller 3 turns off the switch 41 to end the charging operation.

In the step S24, when ending the charging, the controller 3 turns on the switch 42 to supply power from the secondary battery 1 to the load 6, thus starting discharging.

In the step S25, the controller 3 receives the discharging current of the secondary battery 1 and integrates the discharging capacity.

In the step S26, the controller 3 receives the voltage of the secondary battery 1 and determines whether or not the voltage of the secondary battery 1 has reached the lower limit.

In the step S27, when determining that the voltage of the secondary battery 1 has reached the lower limit, the controller 3 turns off the switch 42 to end the discharging operation.

In the step S28, when ending the discharging operation, the controller 3 terminates the capacity integration. Then, in the step S29, the controller 3 updates the stored full charging capacity value in the full charging capacity memory 7.

There are the following five methods of detecting full charging in the step S22.

According to the first method, a battery voltage variation ($\Delta V/\Delta t$) per unit time is measured after a lapse of a predetermined time (ts) from the beginning of charging. When the battery voltage variation ($\Delta V/\Delta t$) exceeds a predetermined set value ($\Delta Vx1$), it is determined that the secondary battery is in a fully charged state.

According to the second method, a battery voltage variation ($\Delta V/\Delta t$) per unit time and a temperature variation ($\Delta T/\Delta t$) per unit time are first measured. When both the battery voltage variation ($\Delta V/\Delta t$) reaches a predetermined value ($\Delta Vx1$) and the temperature variation ($\Delta T/\Delta t$) reaches a predetermined value ($\Delta Tx$), it is determined that the secondary battery is in a fully charged state.

According to the third method, a battery voltage variation ($\Delta V/\Delta t$) per unit time and a battery temperature (T) are measured. When the battery voltage variation ($\Delta V/\Delta t$) reaches a predetermined value ($\Delta Vx1$) and the temperature (T) reaches a predetermined value (Tx), it is determined that the secondary battery is in a fully charged state.

According to the fourth method, a memory previously stores the maximum value (Vp) of a battery voltage during charging. When the battery voltage (V) during charging reaches the maximum value (Vp) stored in the memory, it is determined that the secondary battery is in a fully charged state.

According to the fifth method, a battery voltage drop ($-\Delta V$) and a battery temperature (T) are measured. When the battery voltage drop (−ΔV) reaches a predetermined set value (−ΔVx1) or the battery temperature (T) reaches a predetermined set value (Tx), it is determined that the secondary battery is in a full charging state. (For example, refer to JP-P1994-315233A)

As to one advantage of the present invention, even when deteriorating through repeated charging/discharging operations, the secondary battery is not charged so as to exceed 70% and more of its full charging capacity. The reason is that when the charging capacity reaches 70% or more of the full charging capacity, the charging operation is ceased by detecting whether or not the battery voltage variation dV/dt or the battery temperature variation dT/dt has reached to a specified value.

As to another advantage of the present invention, even when the integration error of the charging capacity occurs, the secondary battery is not charged so as to exceed 70% and more of the full charging capacity. The reason is that 70% or more of the full charging capacity can be detected through sensing the battery voltage variation dV/dt or the battery temperature variation dT/dt.

The entire disclosure of Japanese Patent Application No. 2001-324664 filed on Oct. 23, 2001 including specification, claims, drawings and summary are incorporated herein by reference in its entirely.

What is claimed is:

1. An apparatus for charging and discharging a nonaqueous electrolyte secondary battery, said apparatus comprising:
   a first switch for connecting or disconnecting a secondary battery and a charging power source;
   a second switch for connecting or disconnecting the secondary battery and a load;
   a full charging capacity memory for storing a full charging capacity value of the secondary battery;
   means for detecting a charging capacity of the secondary battery during charging, for connecting the secondary battery and the charging power source by controlling said first switch when the detected charging capacity is less than a first predetermined ratio of the full charging capacity, and for disconnecting the secondary battery and the charging power source by controlling said first switch when the detected charging capacity is a second predetermined ratio or more of the full charging capacity;
   means for calculating a voltage variation dV/dt of the secondary battery during charging;
   means for calculating a temperature variation dT/dt of the secondary battery during charging;
   means for determining whether or not the voltage variation dV/dt exceeds a first specified value, determining whether or not the temperature variation dT/dt exceeds a second specified value, detecting whether or not the secondary battery is in a full charging state during charging based on the voltage and the temperature of the secondary battery during charging when at least one of the voltage variation dV/dt and the temperature variation dT/dt exceeds the associated specified value, and controlling said second switch when the secondary battery is in a full charging state, thus connecting the secondary battery and the load to permit discharging of the secondary battery; and
   means for detecting completion of discharging of the secondary battery, computing a full charging capacity based on a discharging current when discharging is completed, and updating the full charging capacity value stored in said full charging capacity memory.

2. The apparatus defined in claim 1, wherein the secondary battery comprises a nickel-hydrogen battery.

3. A method for charging and discharging a nonaqueous electrolyte secondary battery, comprising:
   calculating a voltage variation dV/dt of said secondary battery during charging;
   calculating a temperature variation dT/dt of said secondary battery during charging;
   detecting a charging capacity of said secondary battery during charging and then, when the detected charging capacity is less than a first predetermined ratio of a stored full charging capacity, determining whether or not a detected voltage variation dV/dt exceeds a first previously specified value and determining whether or not a detected temperature variation dT/dt exceeds a second previously specified value;
   when at least one of said detected voltage variation dV/dt and said detected temperature variation dT/dt exceeds the associated previously specified value, detecting whether or not said secondary battery during charging is in a full charging state based on the voltage and the temperature of said secondary battery during charging;
   discharging said secondary battery when a full charging state is detected;
   detecting completion of discharging of said secondary battery;
   computing, upon completion of discharging, a full charging capacity based on a discharging current of said secondary battery, and updating said stored full charging capacity; and
   completing charging of said secondary battery when said stored charging capacity is a predetermined ratio or more of a stored full charging capacity.

4. The method defined in claim 3, further comprising charging said secondary battery unconditionally in initial charging thereof until a current charging capacity reaches to 20% of said stored full charging capacity value.

5. A method for charging and discharging a nonaqueous electrolyte secondary battery, comprising:
   re-charging a battery, which is discharged, to less than a full charging amount of said battery;
   performing a maintenance charging/discharging operation to avoid the possibility of an erroneous full charging capacity when dV/dt exceeds a specific value "a" before said charging capacity exceeds 70% of said full charging capacity; and
   supplying a re-charging amount to a load.

6. The method defined in claim 5, wherein said re-charging amount is set to 70% of said full charging amount.

7. The method defined in claim 5, further comprising continuously charging said battery unconditionally in initial charging thereof until a current charging capacity reaches 20% of a reference charging amount.

8. The method defined in claim 5, wherein said battery comprises a nickel-hydrogen battery.

9. A method for charging and discharging a nonaqueous electrolyte secondary battery, comprising:
   continuously charging said secondary battery unconditionally until a charging capacity exceeds 20% of a full charging capacity to avoid the temperature and the voltage of said battery becoming unstable in initial charging;

ending the charging operation when said charging capacity exceeds 70% of said full charging capacity;

performing a maintenance charging/discharging operation to avoid the possibility of an erroneous full charging capacity when dV/dt exceeds a specific value "a" before said charging capacity exceeds 70% of said full charging capacity; and performing a maintenance charging/discharging operation to avoid the possibility of an erroneous full charging capacity when dT/dt exceeds a specific value "b" before said charging capacity exceeds 70% of said full charging capacity.

10. The method defined in claim 9, further comprising, with a controller:

acquiring a voltage of said battery from a voltage measuring section and a temperature of said battery from a temperature measuring section and thus detecting full charging;

when full charging is detected, turning on a switch and supplying power from said battery to a load;

simultaneously acquiring a discharging current from a charge/discharge current measuring section and integrating a discharging capacity; and simultaneously acquiring a battery voltage of said battery from a voltage measuring section, ending discharging and capacity integration by turning off the switch when the battery voltage becomes empty, and updating said full charging capacity.

11. The method defined in claim 5, further comprising performing a maintenance charging/discharging operation to avoid the possibility of an erroneous full charging capacity when dT/dt exceeds a specific value "b" before said charging capacity exceeds 70% of said full charging capacity.

12. A method for charging and discharging a nonaqueous electrolyte secondary battery, comprising:

re-charging a battery, which is discharged, to less than a full charging amount of said battery;

performing a maintenance charging/discharging operation to avoid the possibility of an erroneous full charging capacity when dT/dt exceeds a specific value "b" before said charging capacity exceeds 70% of said full charging capacity; and supplying a re-charging amount to a load.

13. An apparatus for charging and discharging a battery, said apparatus comprising:

a first switch for connecting or disconnecting a battery and a charging power source;

a second switch for connecting or disconnecting the battery and a load;

a full charging capacity memory for storing a full charging capacity value of the battery; and a controller, wherein:

said controller is responsive to the charging capacity of the battery during charging being less than a first predetermined ratio of the full charging capacity, for controlling said first switch to connect the battery and the charging power source, and responsive to the charging capacity of the battery being at least a second predetermined ratio of the full charging capacity for controlling said first switch to disconnect the battery and the charging power source;

said controller is further responsive to at least one of the voltage variation dV/dt exceeding a first specified value and the temperature variation dT/dt exceeding a second associated specified value for detecting whether or not the battery is in a full charging state during charging based on the voltage and the temperature of the battery;

said controller is further responsive to the battery being in a full charging state for controlling said second switch to connect the battery and the load; and said controller is further responsive to discharging of the battery being completed for computing a full charging capacity based on a discharging current.

14. The apparatus defined in claim 13, wherein said controller is further responsive to discharging of the battery being completed for updating the full charging capacity value stored in said full charging capacity memory.

15. A method for charging and discharging a battery, said method comprising:

calculating a voltage variation dV/dt of said battery during charging;

calculating a temperature variation dT/dt of said battery during charging;

when said battery is completely discharged, computing a full charging capacity based on a discharging current of said battery detecting a charging capacity of said battery;

when the detected charging capacity is less than a first predetermined ratio of the full charging capacity, charging the battery, determining whether or not a detected voltage variation dV/dt exceeds a first previously specified value, and determining whether or not a detected temperature variation dT/dt exceeds a second previously specified value;

when at least one of said detected voltage variation dV/dt and said detected temperature variation dT/dt exceeds the associated previously specified value, detecting whether or not said battery is fully charged based on the voltage and the temperature of said battery.

16. The method defined in claim 15, further comprising storing the full charging capacity.

17. A method for charging and discharging a battery, comprising:

re-charging a battery, which is discharged, to less than a full charging amount of said battery;

performing a maintenance charging/discharging operation when dV/dt exceeds a specific value "a" before said charging capacity exceeds 70% of said full charging capacity; and supplying a re-charging amount to a load.

18. The method defined in claim 17, further comprising performing a maintenance charging/discharging operation when dT/dt exceeds a specific value "b" before said charging capacity exceeds 70% of said full charging capacity.

19. A method for charging and discharging a battery, comprising:

charging said battery until a charging capacity exceeds 20% of a full charging capacity;

ending the charging operation when said charging capacity exceeds 70% of said full charging capacity;

performing a maintenance charging/discharging operation when dV/dt exceeds a specific value "a" before said charging capacity exceeds 70% of said full charging capacity; and performing a maintenance charging/discharging operation when dT/dt exceeds a specific value "b" before said charging capacity exceeds 70% of said full charging capacity.

20. The method defined in claim 19, further comprising:

acquiring a voltage of said battery so as to detect full charging;

when full charging is detected, supplying power from said battery to a load;

acquiring a discharging current of said battery;

integrating a discharging capacity; and when the battery voltage becomes empty, ending discharging.

21. A method for charging and discharging a battery, comprising:

re-charging a battery, which is discharged, to less than a full charging amount of said battery;

performing a maintenance charging/discharging operation when dT/dt exceeds a specified value "b" said charging capacity exceeds 70% of said full charging capacity; and supplying a re-charging amount to a load.

* * * * *